United States Patent
Zhu et al.

(10) Patent No.: US 9,430,594 B2
(45) Date of Patent: Aug. 30, 2016

(54) NUMERICAL SIMULATION OF PROGRESSIVE LANCING OPERATION IN SHEET METAL FORMING

(71) Applicant: Livermore Software Technology Corporation, Livermore, CA (US)

(72) Inventors: Xinhai Zhu, Pleasanton, CA (US); Li Zhang, Rochester Hills, MI (US)

(73) Assignee: Livermore Software Technology Corp., Livermore, CA (US)

( * ) Notice: Subject to any disclaimer, the term of this patent is extended or adjusted under 35 U.S.C. 154(b) by 543 days.

(21) Appl. No.: 13/955,638

(22) Filed: Jul. 31, 2013

(65) Prior Publication Data

US 2015/0039273 A1    Feb. 5, 2015

(51) Int. Cl.
  *G06F 17/50*  (2006.01)
(52) U.S. Cl.
  CPC ....... *G06F 17/5018* (2013.01); *G06F 2217/41* (2013.01); *G06F 2217/42* (2013.01)
(58) Field of Classification Search
  CPC .......... G06F 17/5009; G06F 17/5018; G06F 2217/16
  USPC .......................................................... 703/2
  See application file for complete search history.

(56) References Cited

U.S. PATENT DOCUMENTS 7,167,816 B1 * 1/2007 Olovsson ................ G06T 17/20
                                                    700/98
2009/0299702 A1 * 12/2009 Grimes ............... G06F 17/5018
                                                    703/1

OTHER PUBLICATIONS eta Engineering Technology Associates Inc. "eta/DYNAFORM User's Manual Version 5.5", Enigineering Technology Associates Inc., Troy, MI, USA, 2006, pp. 1-527.*
Dolbow "an extended finite element method for modeling crack growth with frictional contact", Comput. Methods Appl. Mech. Engrg., 190 (2001), pp. 6825-6846.*
Mabogo "development of techniques using finite element and meshless methods for simulation of piercing", Thesis, Cape Peninsula University of Technology, Feb. 2009, pp. 1-121.*

* cited by examiner

*Primary Examiner* — Omar Fernandez Rivas
*Assistant Examiner* — Shiuh-Huei Ku
(74) *Attorney, Agent, or Firm* — Roger H. Chu

(57) ABSTRACT

Systems and methods of conducting a time-marching simulation of manufacturing a sheet metal part that requires progressive lancing operation (PLO) are disclosed. The time-marching simulation is conducted with a connection-separation scheme for nodes along the lancing route to ensure a smooth timely separation of a lancing cut. The scheme includes creating a set of surrogate lancing route nodes by duplicating nodal coordinates of the existed nodes located along the lancing route. Nodal constraints to initially link together the existed nodes and the corresponding surrogate nodes are then created. The nodal constraint is removed in accordance with a separation time schedule established using start and end locations of the lancing route and corresponding start and end time for making the lancing cut. The nodal constraints can also be removed based on the zones of the lancing route defined by a user.

19 Claims, 15 Drawing Sheets

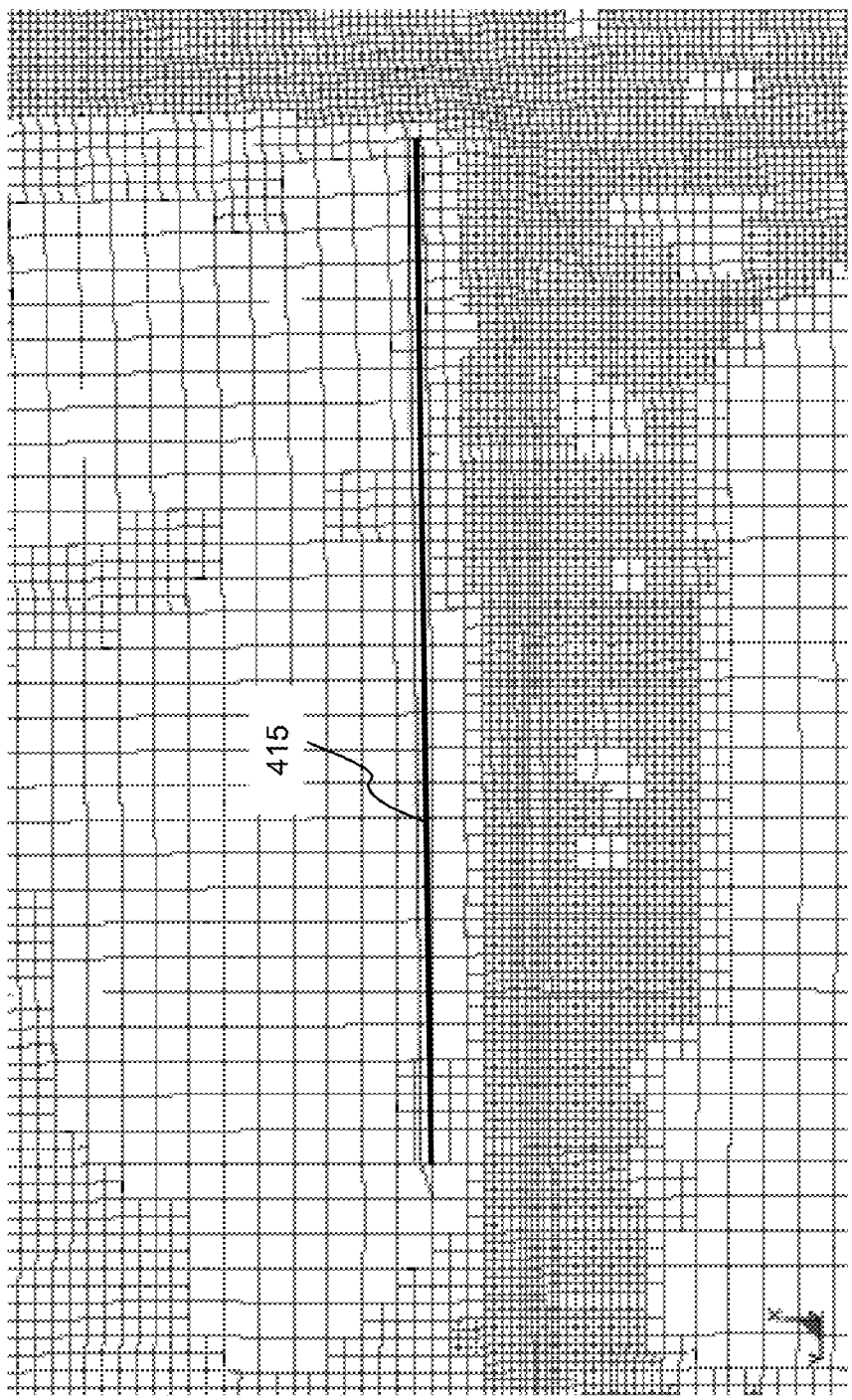

NUMERICAL SIMULATION OF PROGRESSIVE LANCING OPERATION IN SHEET METAL FORMING

FIELD

The present invention generally relates to computer aided engineering analysis for simulating sheet metal forming or stamping process (e.g., deep drawing), more particularly to methods and systems for conducting a time-marching simulation of manufacturing a sheet metal part that requires progressive lancing operation (PLO).

BACKGROUND

Sheet metal forming has been used in the industry for years for creating metal parts from a blank sheet metal, for example, automobile manufacturers and their suppliers produce many of the parts using sheet metal forming. One of the most used sheet metal forming processes is referred as draw forming or stamping. Cross-section view of an exemplary deep draw stamping set up is shown in FIG. 1. To create a part or product, it involves a hydraulic or mechanical press pushing a specially-shaped die 110 onto a matching punch 130 with a piece of blank sheet metal 120 or workpiece in between. The blank 120 is initially supported by a binder 108 and/or the punch 130. The binder 108 is sometimes referred to as binder ring, ring or blank holder, which is situated on top of a die cushion 106 that is actuated by air, oil, rubber or springs 107. Exemplary products made from the sheet metal forming process include, but are not limited to, car hood, fender, door, automotive fuel tank, kitchen sink, aluminum can, etc. In deep drawing, the depth of a part or product being made is generally more than half its diameter. As a result, the blank 120 is stretched and therefore thinned in various locations due to the geometry of the part or product. The part or product is only good when there is no structural defect such as material failure (e.g., cracking, tearing, wrinkling, necking, etc.).

In certain situations, severe metal forming conditions may be encountered (e.g., narrow high gradient portion near window opening of a car door). To alleviate such severe forming condition, a technique is referred to as lancing operation is used. In lancing operation, a cut is made to a scrap portion of a blank sheet metal 120 near an area subject to severe forming condition. Lancing route or path of a lancing cut is generally a smooth curve (e.g., straight line, open curve, etc.). At many instances, the lancing cut is made gradually in time as the blank 120 being pressed by the punch 130. This is referred to as progressive lancing operation. As shown in FIG. 1, a sloped lance or knife 111 is disposed on the die face and a corresponding slot 112 on the punch 130 to achieve such a lancing operation. The height (H1) 115 of the knife 111 is adjustable so that the start of a lancing cut can be achieved at various distances of the die 110 from the position of being fully closed with the punch 130. This height can be fully determined using the numerical simulation. Two examples of lancing route are shown in FIG. 2. In the first sheet metal part 202, there is a scrap area 212 with a straight-line lancing route 222. In the second part 204, there is another scrap area 214 with a curved-line lancing route 224. Other lancing route such as a closed curve can also be used.

With advent of computer technology, manufacturing procedure of a product can be numerically simulated using computer aided engineering analysis (e.g., finite element analysis (FEA)). FEA is a computerized method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate the elements with the material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, physical constraints, etc.) are specified. In this fashion a model of the object and its environment is created.

FEA has been using for numerically simulating manufacturing process of sheet metal forming to ensure formability (i.e., the sheet metal forming setup suitable for producing a part that meets the criteria). However, prior art approaches do not simulate progressive lancing operation properly. For example, prior art approaches often result into a distorted lancing route due to finite elements near the lancing route are allowed to freely deform after the initial lancing cut. As a result, the numerically simulated lancing route has a zigzag line. Furthermore, in additional to the distorted deformed FEA mesh, extremely small finite elements may be created. As a result, the numerically simulation either fails due to numerical error in processing such elements or becomes very length due to the size of such elements to maintain numerical stability.

Therefore, it would be desirable to have improved methods and systems for conducting a time-marching simulation of manufacturing a sheet metal part that requires progressive lancing operation (PLO).

SUMMARY

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Systems and methods of conducting a time-marching simulation of manufacturing a sheet metal part that requires progressive lancing operation (PLO) are disclosed. According to one aspect of the invention, a FEA model mesh model representing a blank sheet metal (e.g., a piece of flat sheet metal) along with a die face definition that includes a lancing route of PLO are defined and received in a computer system for conducting a time-marching simulation of manufacturing a sheet metal part (e.g., deep drawing sheet metal forming). Other portions of the metal stamping setup (e.g., punch, blank holder, etc.) are not critical to the invention thereby not described in details.

The FEA model contains a plurality of nodes connected by a plurality of finite elements (e.g., 3- and/or 4-node shell elements). The lancing route is defined by a number of coordinates including start and end locations and corresponding start and end times for making the PLO. The start and end times are in reference to the beginning of the time-marching simulation. The coordinates are measured in a global coordinate system for defining the metal forming simulation setup including the die face.

The time-marching simulation is first conducted until the simulation time has reached the start time of the PLO. The nodes and finite elements of the FEA model are deformed due to contacts with the die face. Next, those finite elements located within close proximity of the lancing route are identified as a group of lancing route elements by comparing the coordinates of the lancing route and the deformed FEA model. When nodal positions of the lancing route elements' corner nodes are determined to be located within close proximity of the lancing route in accordance with a proximity criterion, nodal positions are adjusted to be located on the lancing route. If any of the lancing route elements is crossed by the lancing route, then the particular lancing element is divided into two elements.

The lancing route elements are updated such that those lancing elements located on one side of the lancing route are redefined by replacing the existed nodes with the corresponding surrogate lancing route nodes, while those lancing elements located on opposite side of the lancing route are left unmodified. A set of surrogate lancing route nodes is created by duplicating nodal coordinates of the existed nodes located along the lancing route of the deformed FEA model.

A set of nodal constraints is created to initially link together the existed nodes with the corresponding surrogate lancing nodes. A separation time schedule is then associated with the nodal constraints, the separation time schedule is established using start and end times in conjunction with the start and end locations of the lancing route. Finally, the remaining of the time-marching simulation is conducted thereafter, in which the nodal constraints are removed in accordance with the separation time schedule to achieve the numerical simulation of the PLO.

According to another aspect, the definition of the lancing route includes a number of zones with each zone being assigned a separation time.

According to yet another aspect, the proximity criterion includes 1) calculating the distance between a node of interest and the lancing route, 2) determining the shortest dimension between the node of interest with all of its neighboring corner nodes of the finite elements defined with the node of interest, and 3) designating the node of interest to be located with close proximity of the lancing route when the distance to the lancing route is less than a predefined percentage of the shortest dimension to all neighboring nodes.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIGS. 4A-4C are a sequence of diagrams showing an exemplary FEA model being transformed in a time-marching simulation of sheet metal stamping that requires progressive lancing operation, according to one embodiment of the present invention;

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 3A-10. However, those skilled in the art will readily appreciate that the detailed description given herein with respect to these figures is for explanatory purposes as the invention extends beyond these limited embodiments.

Figure 1:
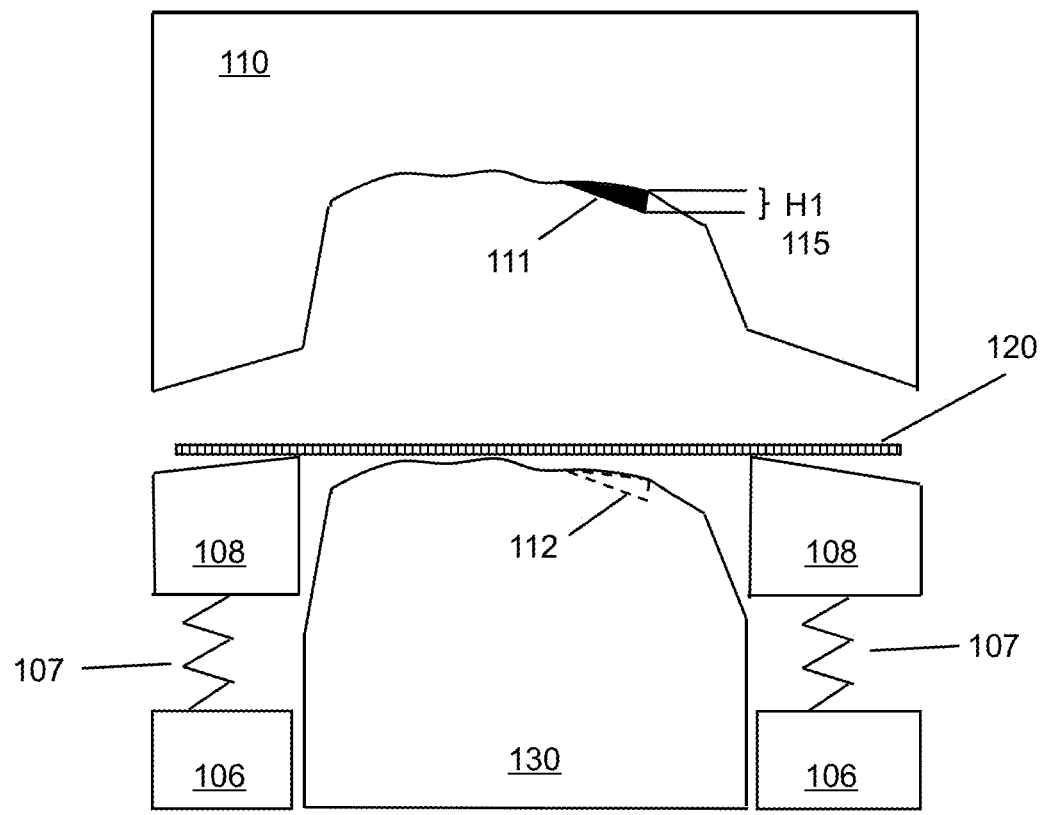
FIG. 1 is a diagram showing an exemplary deep draw manufacturing setup.
Figure 2:
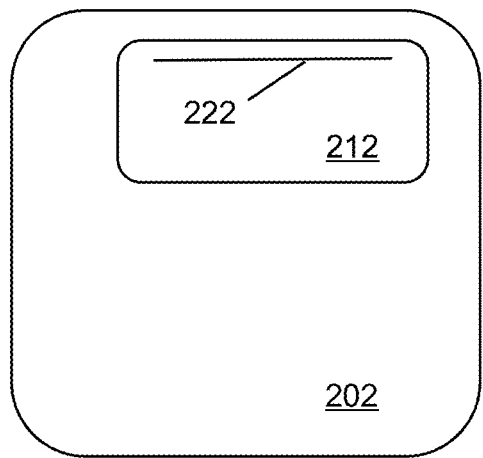
FIG. 2 shows exemplary lancing routes in an lancing operation in sheet metal forming.
Figure 2:
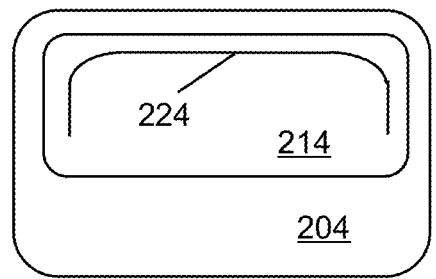
Figure 3A:
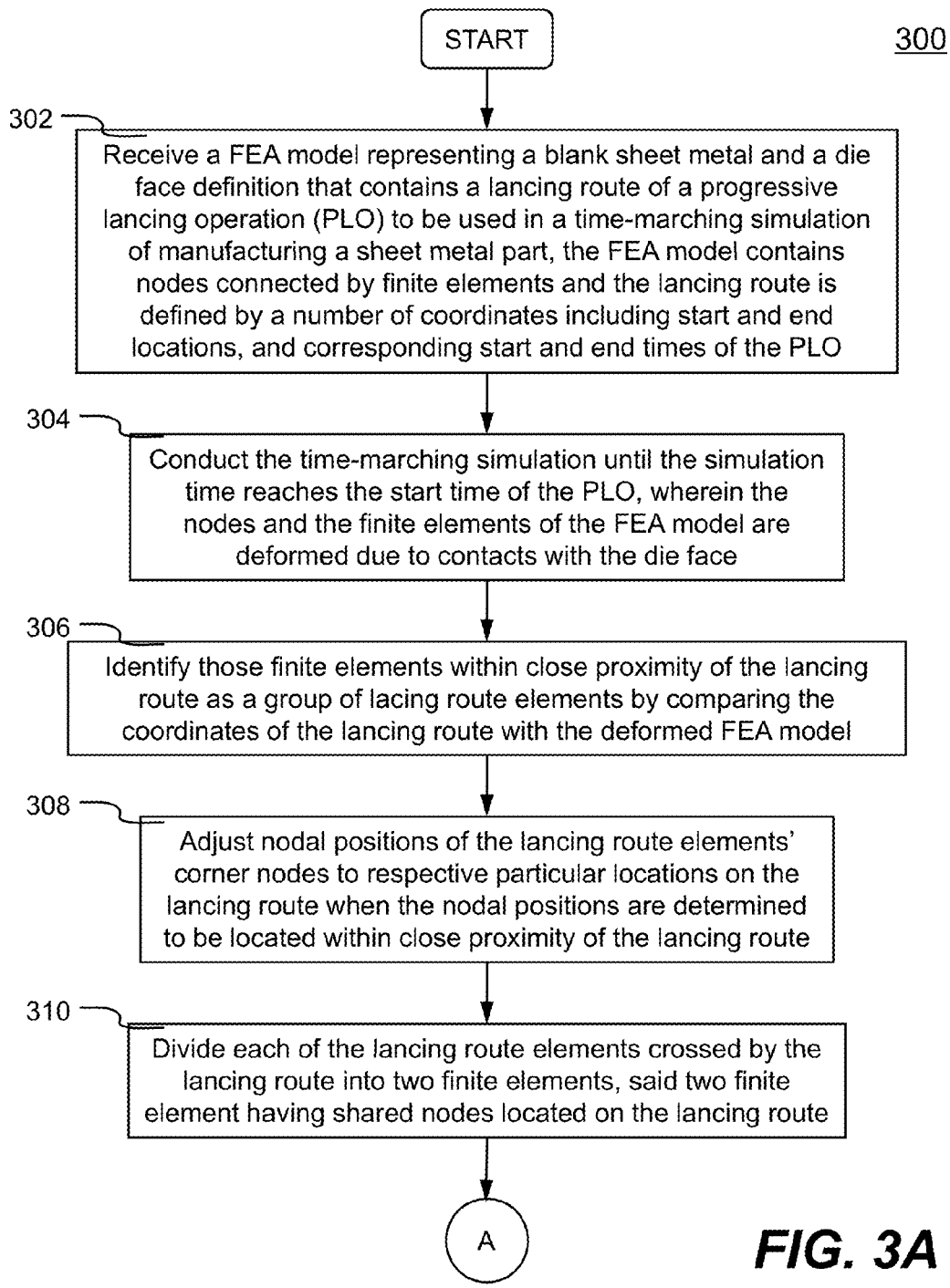
FIGS. 3A-3B collectively are a flowchart illustrating an exemplary process of conducting a time-marching simulation of manufacturing a sheet metal part that requires progressive lancing operation, according to an embodiment of the present invention.
Figure 3B:
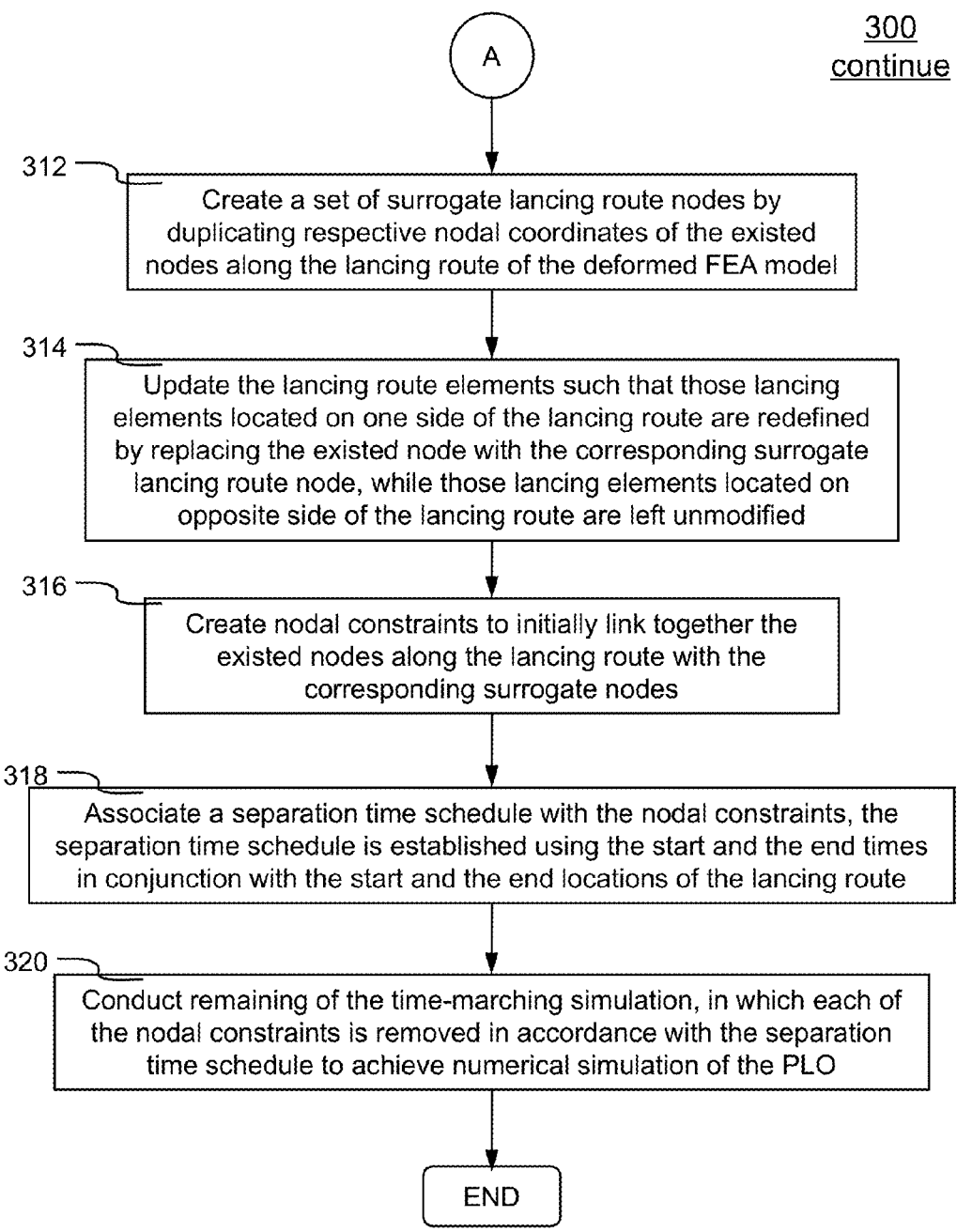

Referring first to FIGS. 3A-3B, it collectively shows a flowchart illustrating an exemplary process 300 of conducting a time-marching simulation of manufacturing a sheet metal part that requires progressive lancing operation (PLO) in accordance with one embodiment of the present invention. Process 300 is preferably implemented in software and understood with other figures (e.g., FIGS. 4A-9).

Figure 4A:
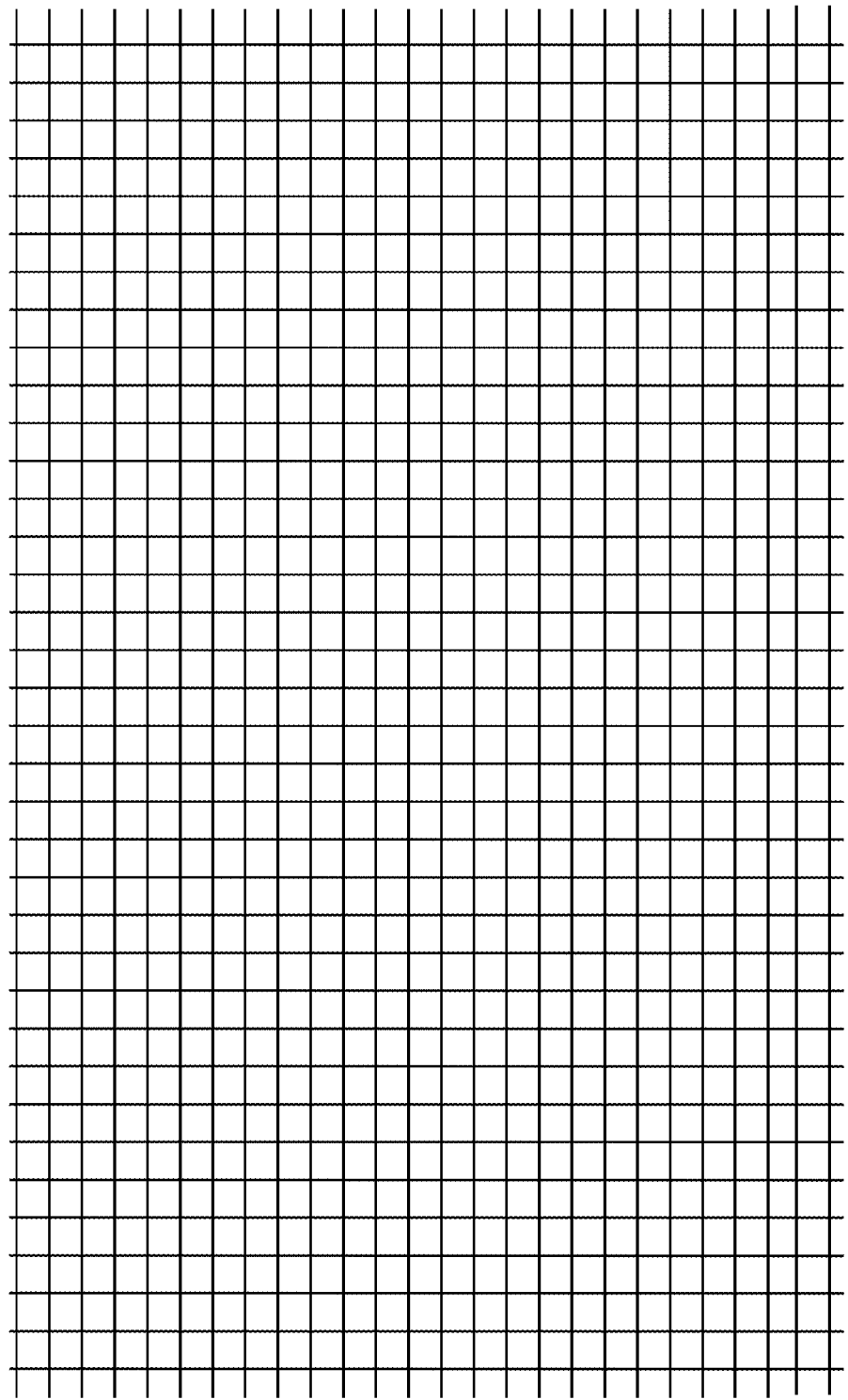
Figure 5A:
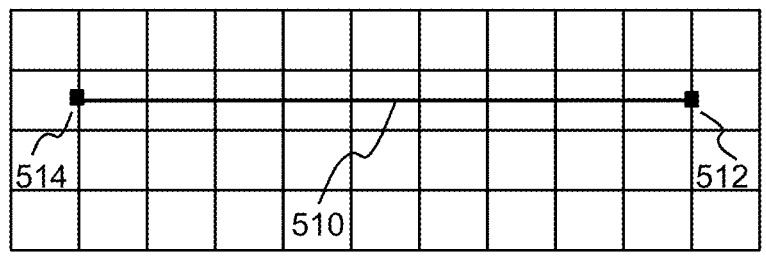
FIGS. 5A-5C are diagrams showing exemplary lancing routes in FEA model in accordance with an embodiment of the present invention.
Figure 5B:
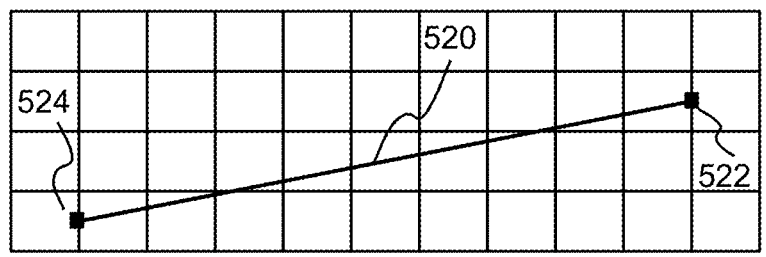
Figure 5C:
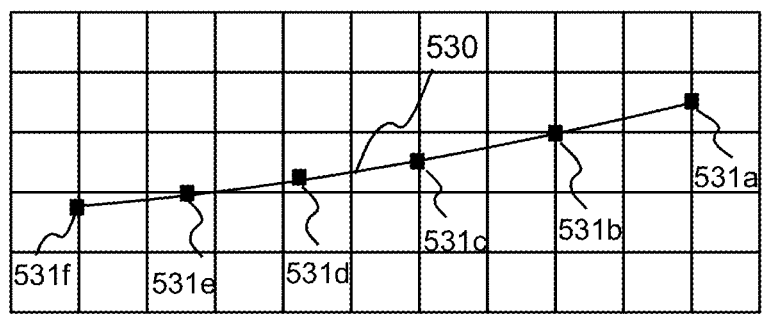
Figure 9:
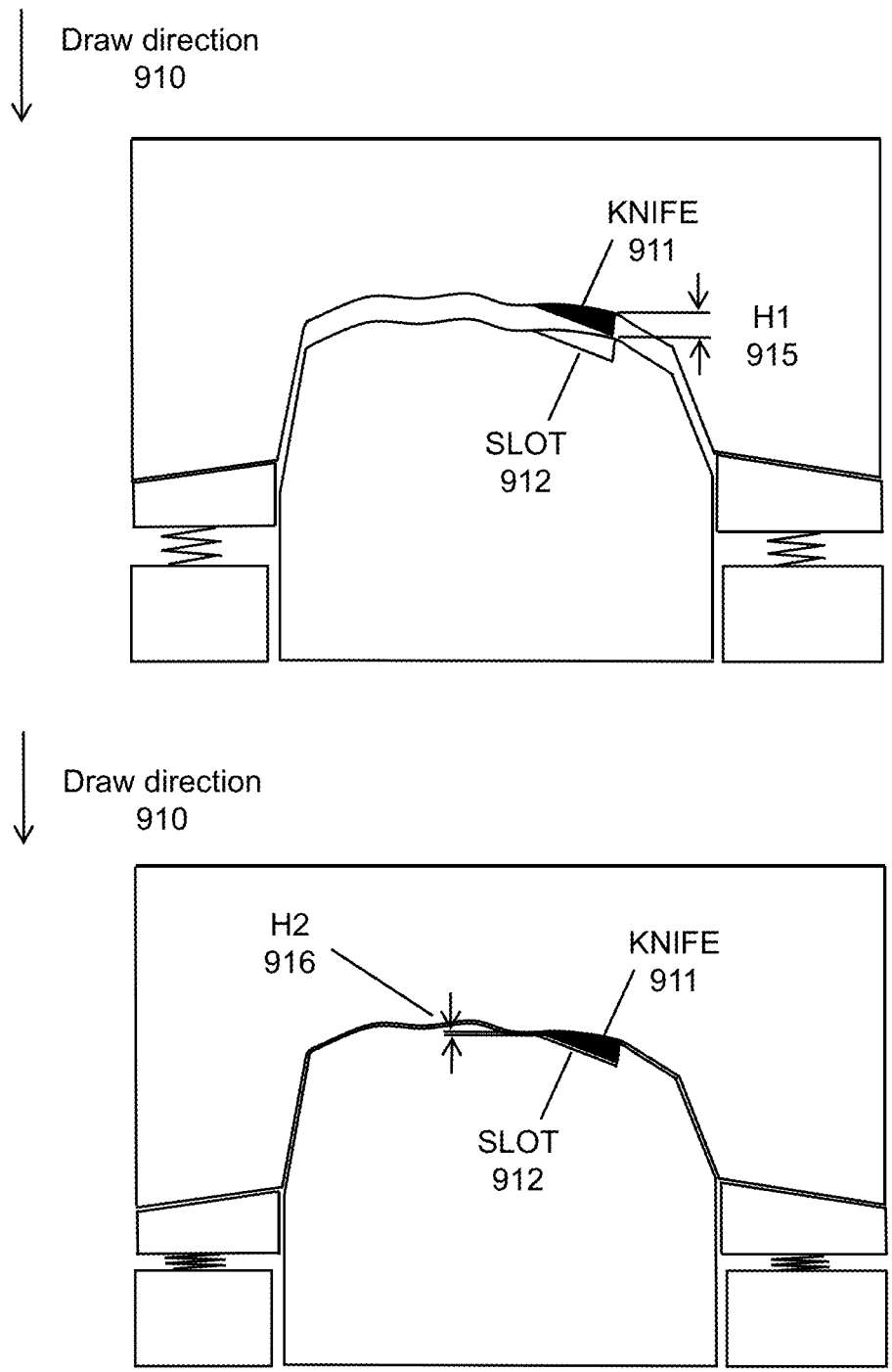
FIG. 9 is a diagram showing an exemplary deep drawing setup having a knife and corresponding slot for progressive lancing operation in accordance with one embodiment of the present invention.

Process 300 starts at step 302 by receiving, in a computer system (e.g., computer system 1000 of FIG. 10), a finite element analysis (FEA) model representing a blank sheet metal along with a definition of die face that contains a lancing route of the PLO to be used in a time-marching simulation of manufacturing a sheet metal part. The FEA model includes a number of nodes connected by a number of finite elements (e.g., 3- and/or 4-node shell elements). For example, the FEA model 400 shown in FIG. 4A is a partial mesh model representing the blank sheet metal before being manufactured into a part. The lancing route is defined by two or more coordinates including start and end locations, and corresponding start and end times of the PLO. The end time of PLO is generally set to be slightly smaller than the total simulation time in the time-marching simulation. In an alternative embodiment, the start and end times of the PLO can be specified as start (H1) 915 and end (H2) 916 distances of the knife 911 as shown in FIG. 9. Also shown in FIG. 9 are slot 912 to accept the knife 911 and the draw direction 910. Exemplary lancing route definitions are shown in FIGS. 5A-5C. Lancing routes 510 and 520 are straight-line defined by start 512-522 and end 514-524 locations, respectively. The lancing route 530 is a curved-line defined by a number of coordinates 531a-531f.

The coordinates are measured in a global coordinate system for defining the metal stamping setup including the die face in the time-domain simulation. In other words, the coordinates are fixed in space while the nodes and finite elements of the FEA model may be deformed thereby being moved due to contact with the die face during the time-marching simulation. The start and end times are in reference to the simulation time used in the time-marching simulation. Generally, in the beginning of the time-marching simulation, the simulation time is set of zero. For example, the start time can be 0.3 second while the end time is 0.5 second with the time-marching simulation starts at o second.

At step 304, the time-marching simulation of manufacturing a sheet metal part is conducted until the simulation time has reached the start time of the PLO. The nodes and finite elements of the FEA model are deformed at this stage due to contacts with the die face. In addition, when adaptive meshing option is used in the time-marching simulation, some portions of the FEA model are refined to accommodate high deformation. An exemplary refined and deformed FEA mesh model 410 is shown in FIG. 4B. Refined portions are shown with denser elements. Also illustrated in the deformed FEA model 410 is an overlapped lancing route 415 (exaggerated with a thicker line).

Figure 6A:
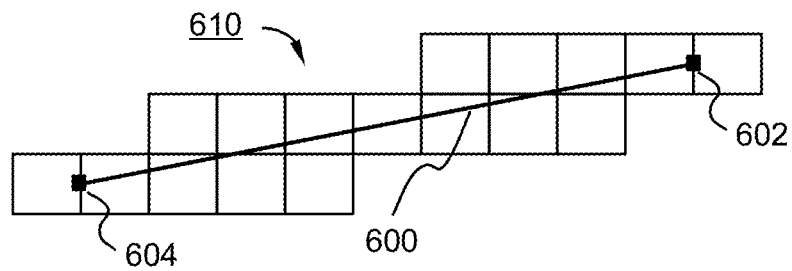
FIGS. 6A-6C are a series of diagrams showing an exemplary node adjustment and lancing route element determination scheme, according to an embodiment of the present invention.

Next, at step 306, those finite elements located within close proximity of the lancing route are identified as a group of lancing route elements. The determination of a particular finite element being located within close proximity of the lancing route can be done by comparing the coordinates that define the lancing routes with the deformed FEA model. FIG. 6A shows an exemplary group of lancing route elements 610 overlapped with an exemplary straight-line lancing route 600 defined by start and end locations 602-604. In this example, the lancing route elements 610 are either being crossed by the lancing route 600 or having one of the corner nodes located within close proximity of the lancing route.

Figure 6B:
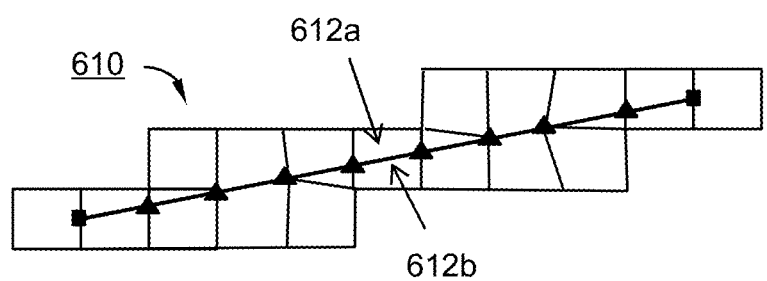

At step 308, nodal positions of the lancing route elements' corner nodes are adjusted to respective locations on the lancing route if any of the nodal positions is determined to be within close proximity of the lancing route based on a proximity criterion. FIG. 6B shows the exemplary group of lancing route elements 610 with some of corner nodes being adjusted. After the adjustment, existed nodes along the lancing route 610 are defined (shown as triangles).

Figure 3C:
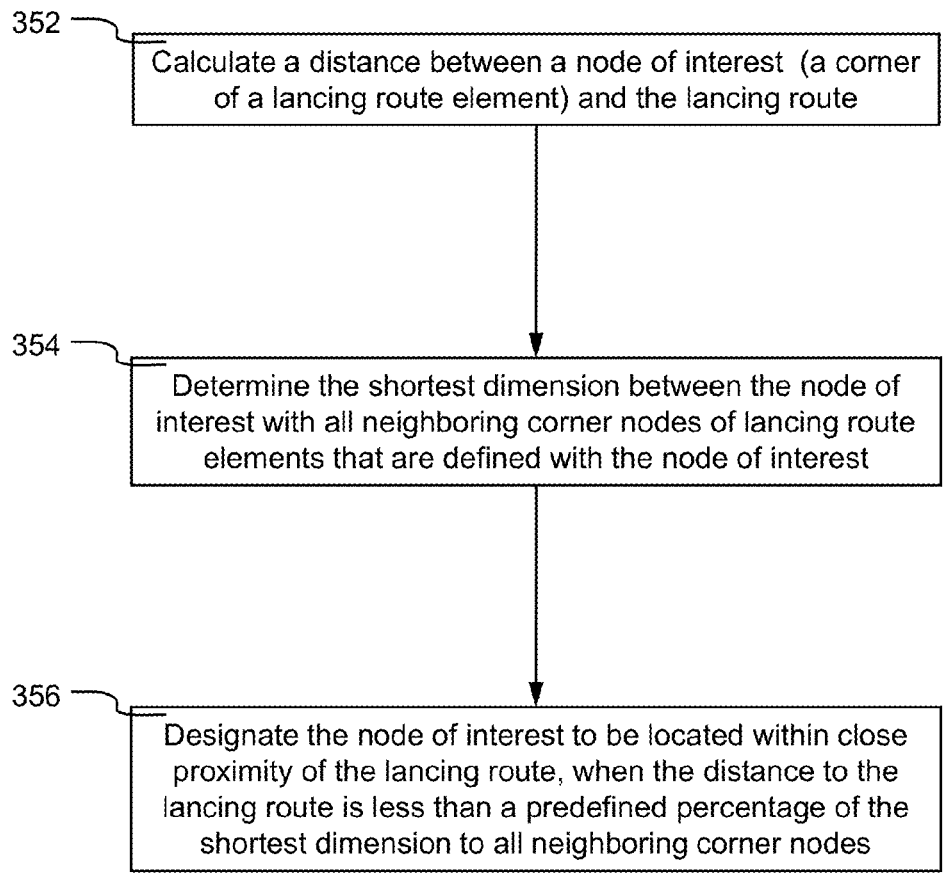
FIG. 3C is a flowchart showing an exemplary process of determining whether a node is located within close proximity of a lancing route, according to an embodiment of the present invention.
Figure 7:
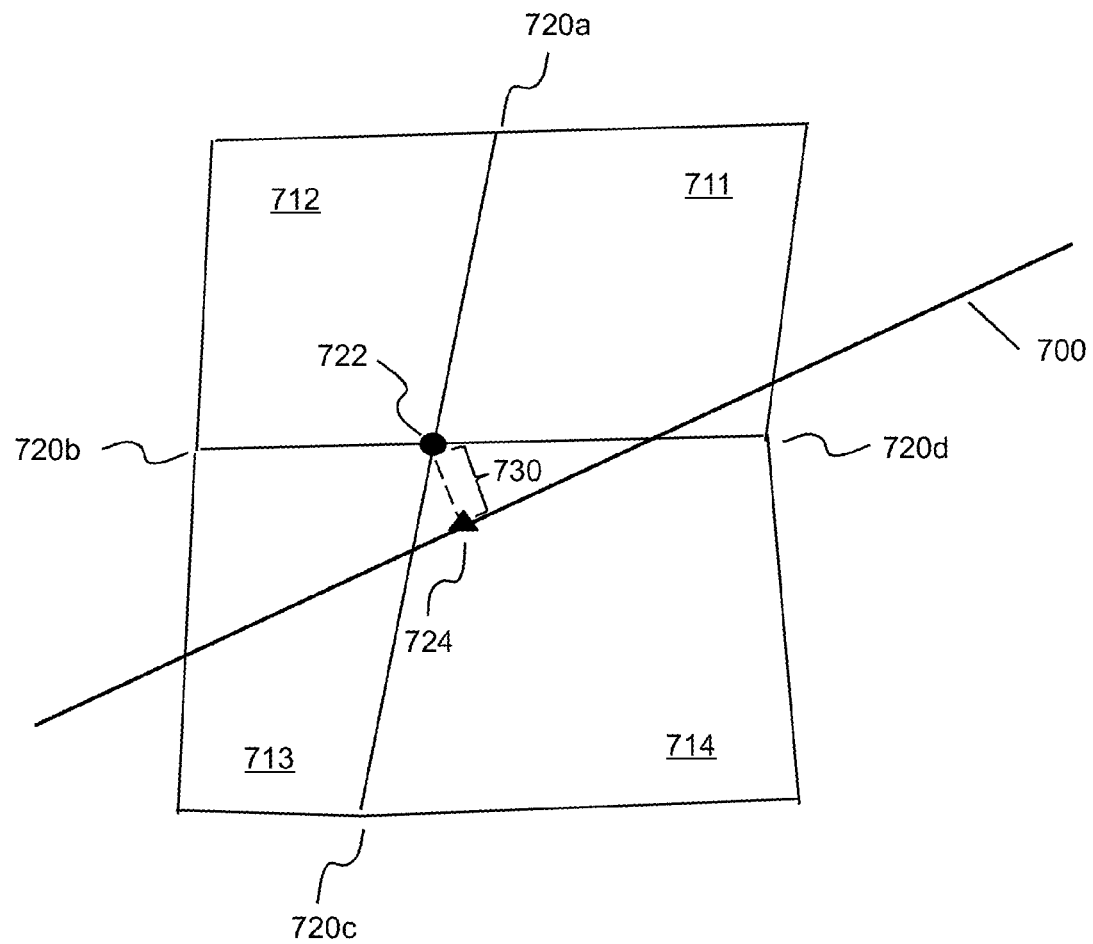
FIG. 7 is a diagram showing an exemplary orientation of a node and a lancing route, and neighboring nodes in accordance with an embodiment of the present invention.

The exemplary process 350 of proximity criterion according to an embodiment is shown in FIG. 3C. FIG. 7 is a diagram depicting a relationship between a corner node of a lancing route element, neighboring corner nodes and a lancing route. First, at step 352, the distance 730 between any node of interest (i.e., corner node 722 of a lancing route element 711) and the lancing route 700 is calculated. For example, the distance 720 is measured between the node of interest 722 and its normal projection point 724 to the lancing route 700. Next, at step 354, the shortest dimension between the node of interest 722 and all corner nodes 730a-730d of the lancing route elements 711-714 defined with the node of interest 722 is determined. In the example shown in FIG. 7, the shortest dimension is between node 722 and 720b. At step 356, the node of interest 722 is designated as being located within close proximity of the lancing route 700 when the distance 730 the lancing route is less than a predefined percentage of the shortest dimension to all neighboring corner nodes 720a-720d. One exemplary predefined percentage is set at 30%.

Referring back to process 300, at step 310, any of the lancing route elements crossed by the lancing route is divided into two distinct finite elements, which share a boundary located on the lancing route. The group of lancing route elements is updated accordingly. An example of a lancing element divided into two elements 612a-612b is shown in FIG. 6B.

Figure 6C:
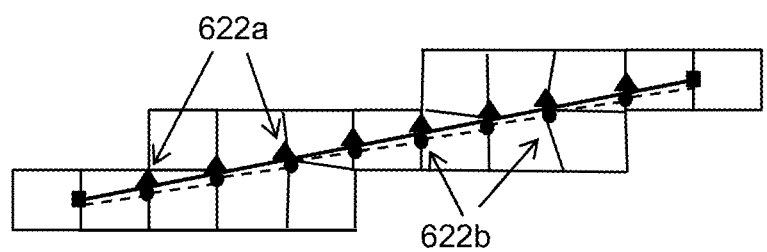

At step 312, a set of surrogate lancing nodes are created by duplicating nodal coordinates of existed nodes along the lancing route of the deformed FEA model. FIG. 6C shows the existed nodes 622a (triangles) and surrogate lancing route nodes 622b (circles). For illustration clarity, these two sets of nodes are drawn with a gap. In reality, they have the same coordinates thereby coinciding with each other without any gap.

Next, at step 314, lancing route elements are updated such that elements located on one side of the lancing route are redefined by replacing the existed nodes with corresponding surrogate nodes while the elements located on the other side of the lancing route are left unmodified. As a result, the lancing route elements located on opposite sides are independent to each other. FIG. 6C shows lancing route elements on opposite sides of the lancing route are defined by different sets of nodes—one side shown in dotted line while the other side shown in solid line.

At step 316, a set of nodal constraints are created to initially link together the existed nodes along the lancing route with the corresponding surrogate nodes. Nodal constraints 888a-888e are shown initially link together the existed lancing nodes 822a with corresponding surrogate lancing nodes 822b in FIG. 8A. Again for visual purpose, a gap is shown (which should not exist because the nodal coordinates of the existed nodes and the surrogate nodes are the same).

Next, at step 318, a separation time schedule is associated with the node constraints. The separation time schedule can be established using the start time and the end time of the PLO in conjunction with the start and end locations of the lancing route. The separate time for a particular node along a straight-line lancing route can be calculated by various well known methods (e.g., linear interpolation). Other methods may be used, for example, user defined. In addition, the lancing route can be divided into zone with each zone being associated with a particular separation time.

Figure 4C:
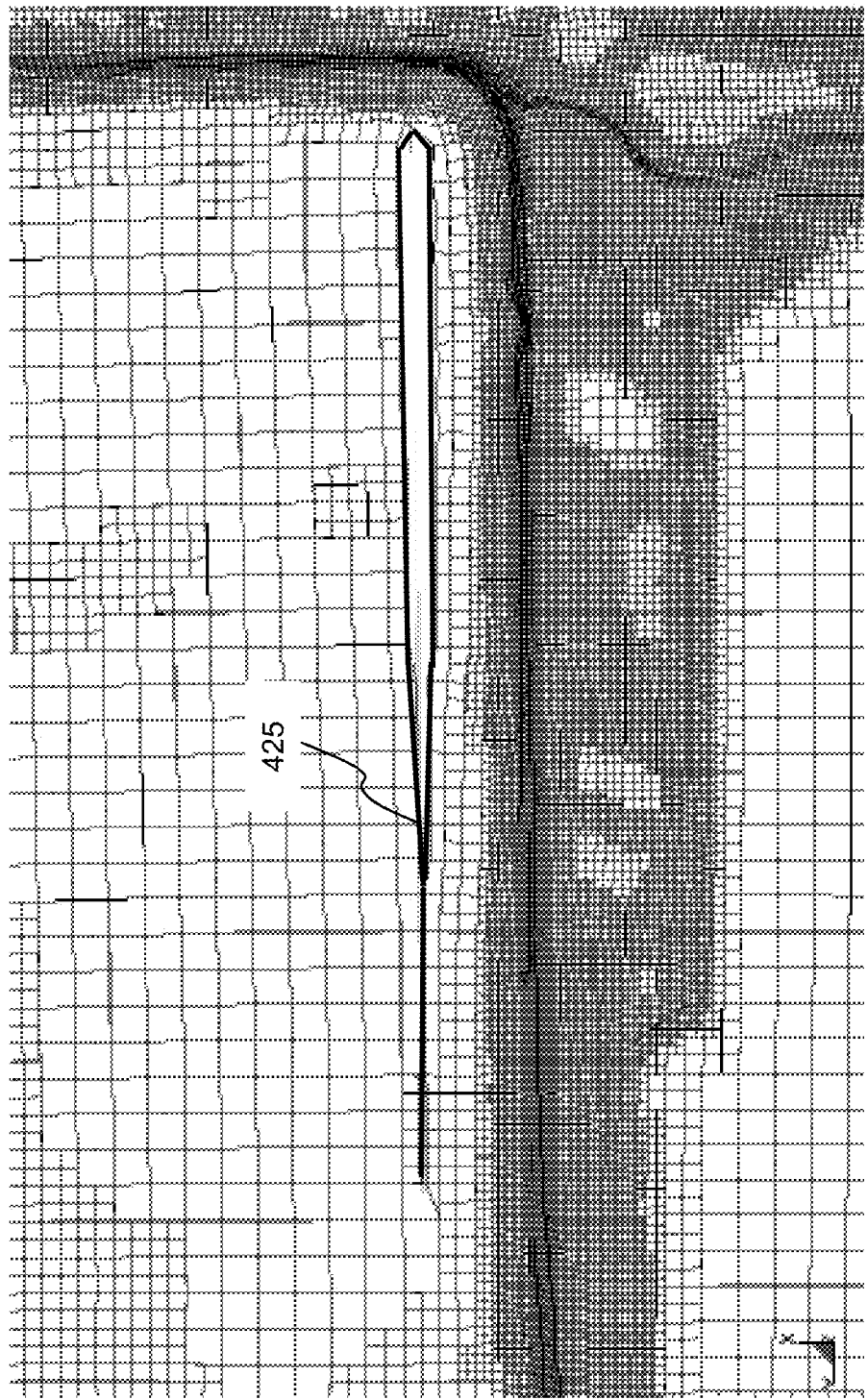
Figure 8A:
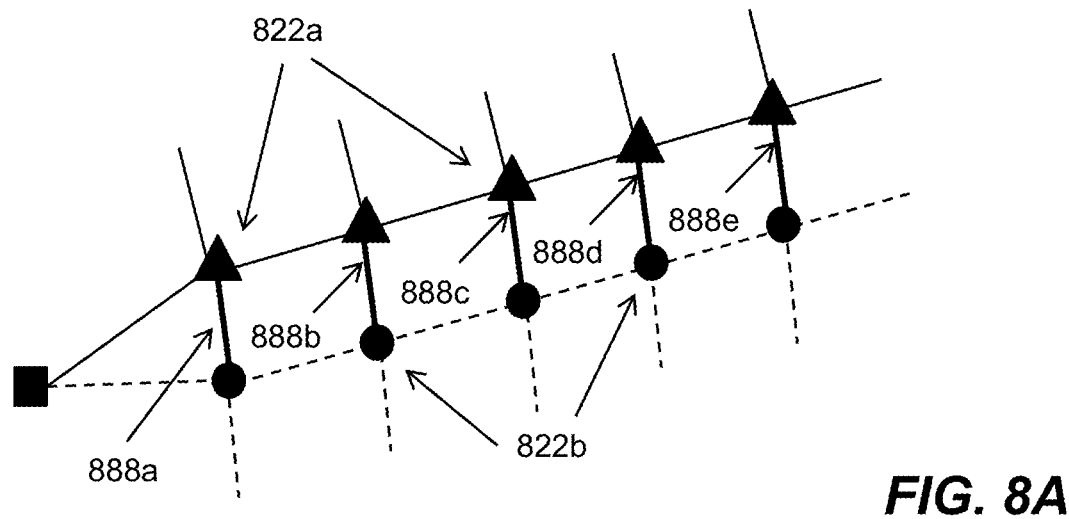
FIGS. 8A-8D are a series of diagrams showing an exemplary separation scheme of a lancing route, according to an embodiment of the present invention.
Figure 8B:
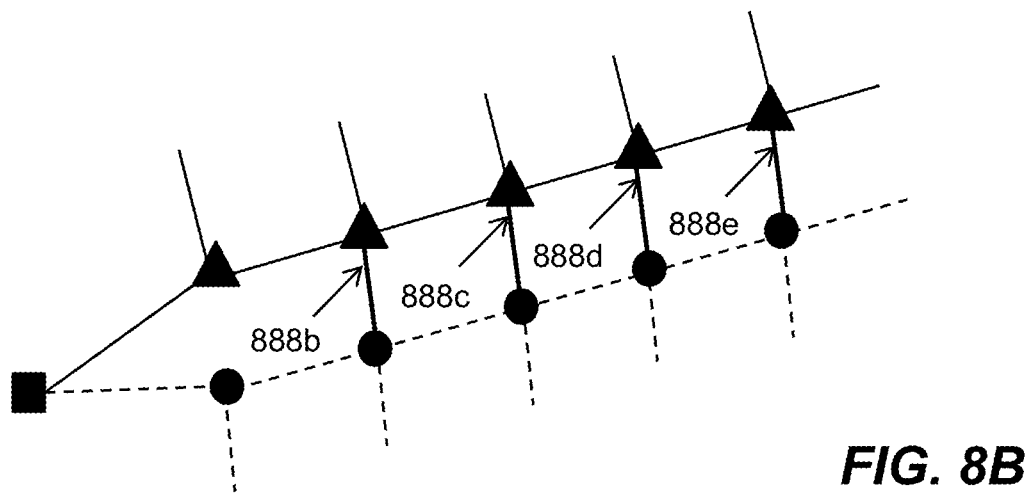
Figure 8C:
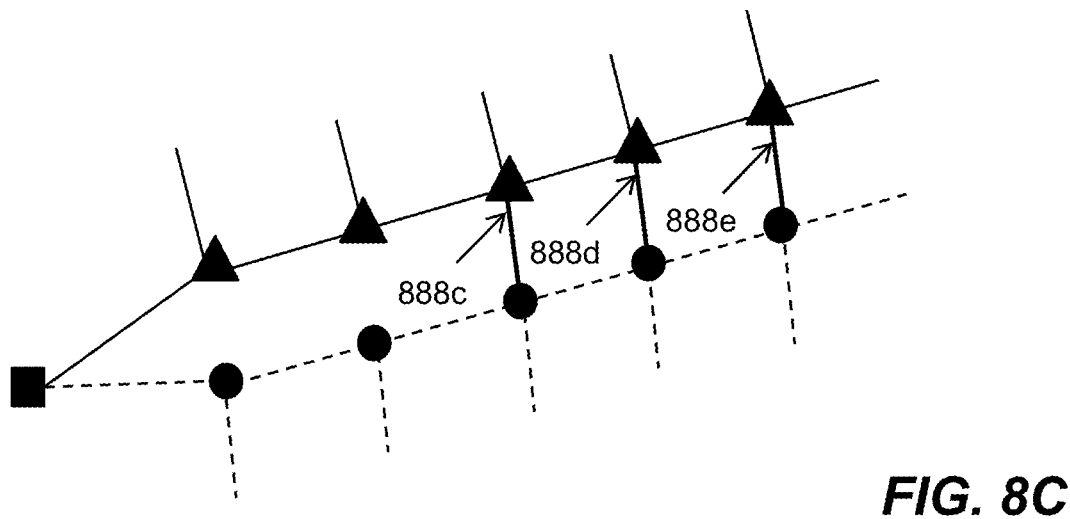
Figure 8D:
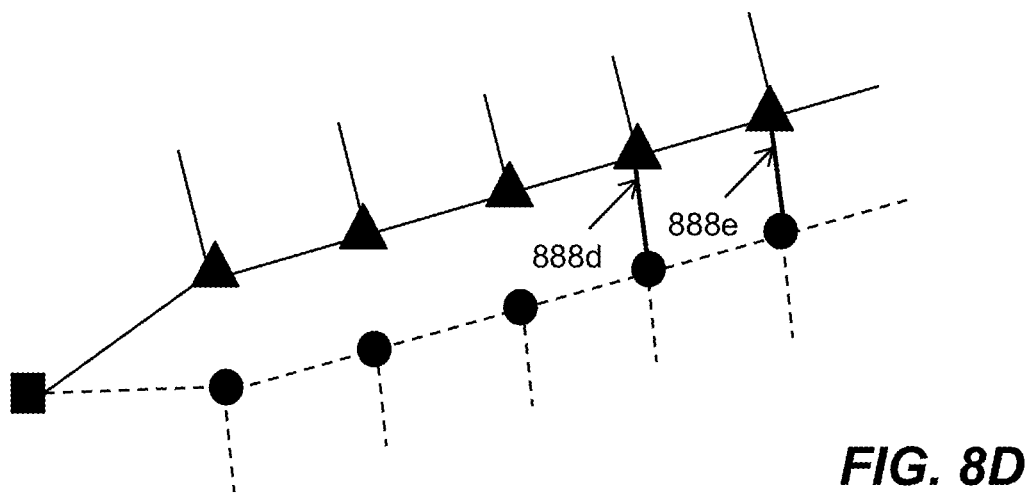

Finally, at step 320, the remaining of the time-marching simulation (i.e., right after the start time of the PLO until the end) is conducted. Each of the nodal constraints is removed according to the separation time schedule thereby achieving the numerical simulation of the PLO. FIGS. 8B-8D show an exemplary series of nodal constraint removal. The nodal constraints 888*a-e* can also be removed in stages—zone by zone. Before removing each nodal constraint, the lancing route node and surrogate node are connected thereby deforming together. FIG. 4C shows a simulation result of an deformed FEA model 420 illustrating an opening 425 due to PLO. The opening 425 has smooth border due to the aforementioned method of using nodal constraint and separation time schedule.

Figure 10:
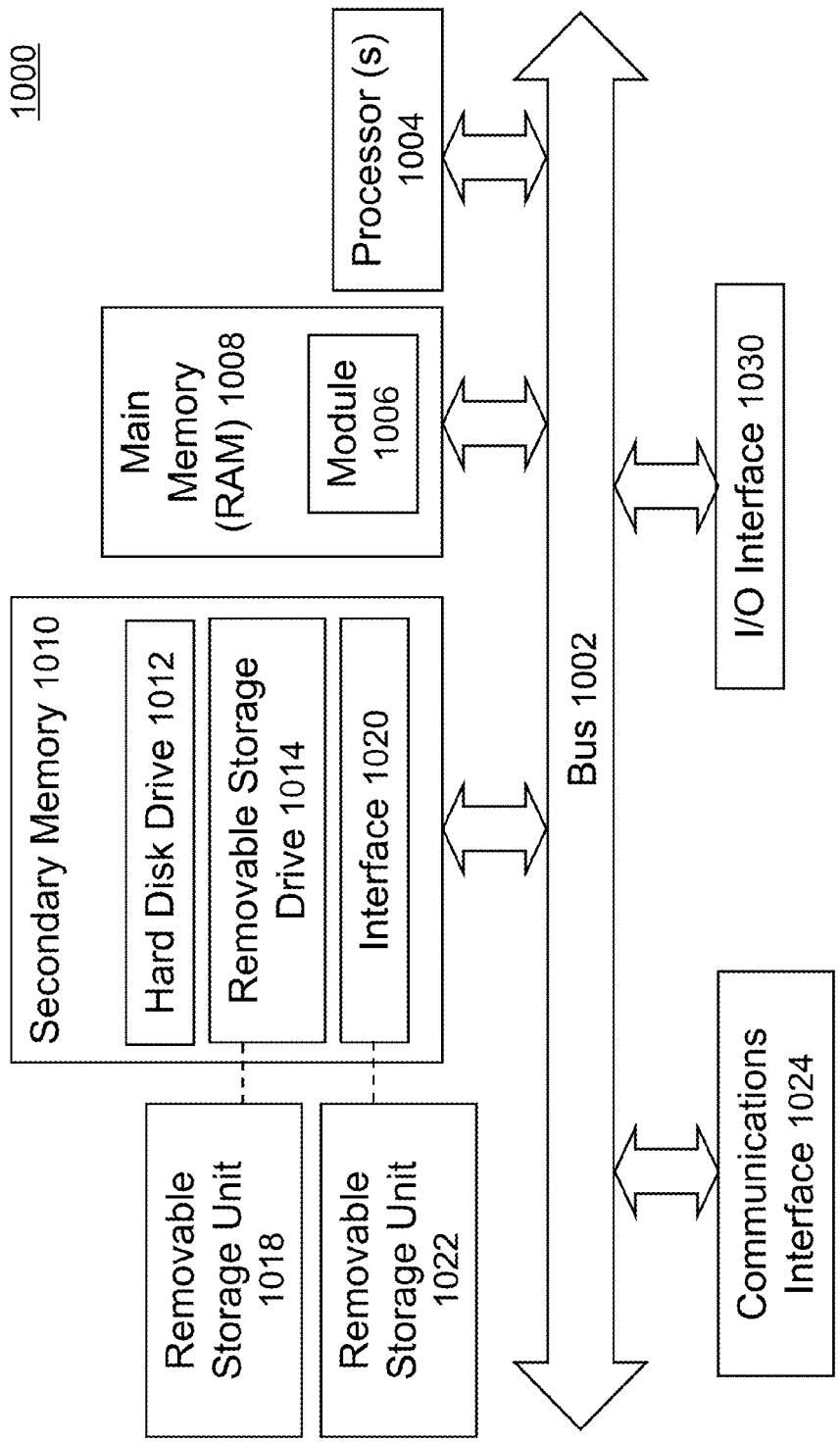
FIG. 10 is a function block diagram showing salient components of an exemplary computer, in which one embodiment of the present invention may be implemented.

According to one aspect, the present invention is directed towards one or more computer systems capable of carrying out the functionality described herein. An example of a computer system 1000 is shown in FIG. 10. The computer system 1000 includes one or more processors, such as processor 1004. The processor 1004 is connected to a computer system internal communication bus 1002. Various software embodiments are described in terms of this exemplary computer system. After reading this description, it will become apparent to a person skilled in the relevant art(s) how to implement the invention using other computer systems and/or computer architectures.

Computer system 1000 also includes a main memory 1008, preferably random access memory (RAM), and may also include a secondary memory 1010. The secondary memory 1010 may include, for example, one or more hard disk drives 1012 and/or one or more removable storage drives 1014, representing a floppy disk drive, a magnetic tape drive, an optical disk drive, etc. The removable storage drive 1014 reads from and/or writes to a removable storage unit 1018 in a well-known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative embodiments, secondary memory 1010 may include other similar means for allowing computer programs or other instructions to be loaded into computer system 1000. Such means may include, for example, a removable storage unit 1022 and an interface 1020. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 1022 and interfaces 1020 which allow software and data to be transferred from the removable storage unit 1022 to computer system 1000. In general, Computer system 1000 is controlled and coordinated by operating system (OS) software, which performs tasks such as process scheduling, memory management, networking and I/O services.

There may also be a communications interface 1024 connecting to the bus 1002. Communications interface 1024 allows software and data to be transferred between computer system 1000 and external devices. Examples of communications interface 1024 may include a modem, a network interface (such as an Ethernet card), a communications port, a Personal Computer Memory Card International Association (PCMCIA) slot and card, etc. Software and data transferred via communications interface 1024. The computer 1000 communicates with other computing devices over a data network based on a special set of rules (i.e., a protocol). One of the common protocols is TCP/IP (Transmission Control Protocol/Internet Protocol) commonly used in the Internet. In general, the communication interface 1024 manages the assembling of a data file into smaller packets that are transmitted over the data network or reassembles received packets into the original data file. In addition, the communication interface 1024 handles the address part of each packet so that it gets to the right destination or intercepts packets destined for the computer 1000. In this document, the terms "computer program medium", "computer readable medium", "computer recordable medium" and "computer usable medium" are used to generally refer to media such as removable storage drive 1014 (e.g., flash storage drive), and/or a hard disk installed in hard disk drive 1012. These computer program products are means for providing software to computer system 1000. The invention is directed to such computer program products.

The computer system 1000 may also include an input/output (I/O) interface 1030, which provides the computer system 1000 to access monitor, keyboard, mouse, printer, scanner, plotter, and the likes.

Computer programs (also called computer control logic) are stored as application modules 1006 in main memory 1008 and/or secondary memory 1010. Computer programs may also be received via communications interface 1024. Such computer programs, when executed, enable the computer system 1000 to perform the features of the present invention as discussed herein. In particular, the computer programs, when executed, enable the processor 1004 to perform features of the present invention. Accordingly, such computer programs represent controllers of the computer system 1000.

In an embodiment where the invention is implemented using software, the software may be stored in a computer program product and loaded into computer system 1000 using removable storage drive 1014, hard drive 1012, or communications interface 1024. The application module 1006, when executed by the processor 1004, causes the processor 1004 to perform the functions of the invention as described herein.

The main memory 1008 may be loaded with one or more application modules 1006 that can be executed by one or more processors 1004 with or without a user input through the I/O interface 1030 to achieve desired tasks. In operation, when at least one processor 1004 executes one of the application modules 1006, the results are computed and stored in the secondary memory 1010 (i.e., hard disk drive 1012). Results of the analysis (e.g., Separation along the lancing route in progressive lancing operation) are reported to the user via the I/O interface 1030 either in a text or in a graphical representation upon user's instructions.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas a straight-line cut has been mostly shown and described as the shape of a cut in progressive lancing operation, other shapes can be used (e.g., curved line or closed curve). Additionally, whereas 4-node shell elements have been shown and described as the finite elements used in the FEA model, other types of shell elements can be used instead, for example, 3- and/or 5-node elements. In summary, the scope of the invention should not be restricted to the specific exemplary embodiments disclosed herein, and all modifications that are readily suggested to those of ordinary skill in the art should be included within the spirit and purview of this application and scope of the appended claims.

We claim:

1. A method of conducting a time-marching simulation of manufacturing a sheet metal part that requires progressive lancing operation, said method comprising:
  receiving, in a computer system, a finite element analysis (FEA) model representing a blank sheet metal and a die face definition that includes a lancing route of a progressive lancing operation (PLO) that starts at a start time and ends at an end time, wherein the FEA model and the die face definition are used in a time-marching simulation of manufacturing a sheet metal part, the FEA model contains a plurality of nodes connected by a plurality of finite elements, and the lancing route is defined by a series of coordinates that includes start and end locations of the lancing route;
  conducting the time-marching simulation until the simulation time reaches the start time of the PLO, wherein the nodes and the finite elements of the FEA model have deformed due to contacts with the die face;
  identifying those of the finite elements crossed by the lancing route as a group of lacing route elements by comparing the coordinates of the lancing route with the deformed FEA model;
  creating a set of respective surrogate lancing route nodes by duplicating existed nodes along the lancing route of the deformed FEA model;
  creating respective nodal constraints to initially link together each of the existed nodes along the lancing route with a corresponding one of the surrogate lancing route nodes;
  splitting each of the lancing route elements into first and second new finite elements with the first new finite element being defined using the surrogate lancing route nodes, while the second new finite element being defined using the existed nodes, as a result, the first new finite element and the second new finite element are connected through the corresponding nodal constraints;
  associating a separation time schedule for progressively removing said nodal constraints between the start time and the end time of the PLO; and
  conducting remaining of the time-marching simulation, in which each of the nodal constraints is removed in accordance with the separation time schedule to achieve numerical simulation of the PLO.

2. The method of claim 1, wherein the lancing route comprises a straight line.

3. The method of claim 1, wherein the lancing route comprises a curve.

4. The method of claim 1, further comprises dividing the lancing route into one or more zones.

5. The method of claim 4, wherein each nodal constraint located in each of said one or more zones is assigned a particular separation time in the separation time schedule.

6. The method of claim 1, wherein said group of lancing route elements further include additional finite elements satisfying a proximity criterion as follows:
  calculating a reference distance between each of the lancing route elements' corner nodes and the lancing route;
  determining a shortest dimension between said each of the lancing route elements' corner nodes and all other neighboring corner nodes; and
  when the reference distance is less than a predefined percentage of the shortest dimension, designating said each of the lancing route elements' corner nodes to be located within close proximity of the lancing route.

7. The method of claim 6, wherein the reference distance is measured from said each of the lancing route elements' corner nodes to a normal projection point on the lancing route.

8. The method of claim 1, wherein said conducting the time-marching simulation until the simulation time reaches the start time of the PLO further comprises refining portion of the finite elements when an adaptive meshing scheme is used in the time-marching simulation.

9. The method of claim 1, wherein said updating the lancing route elements further comprises designating the lancing route elements as non-refineable finite elements in said remaining of the time-marching simulation.

10. A system for conducting a time-marching simulation of manufacturing a sheet metal part that requires progressive lancing operation, the system comprises:
  an input/output (I/O) interface;
  a memory for storing computer readable code for an application module;
  at least one processor coupled to the memory, said at least one processor executing the computer readable code in the memory to cause the application module to perform operations of:
  receiving a finite element analysis (FEA) model representing a blank sheet metal and a die face definition that includes a lancing route of a progressive lancing operation (PLO) that starts at a start time and ends at an end time, wherein the FEA model and the die face definition are used in a time-marching simulation of manufacturing a sheet metal part, the FEA model contains a plurality of nodes connected by a plurality of finite elements, and the lancing route is defined by a series of coordinates that includes start and end locations of the lancing route;
  conducting the time-marching simulation until the simulation time reaches the start time of the PLO, wherein the nodes and the finite elements of the FEA model have deformed due to contacts with the die face;
  identifying those of the finite elements crossed by the lancing route as a group of lacing route elements by comparing the coordinates of the lancing route with the deformed FEA model;
  creating a set of respective surrogate lancing route nodes by duplicating existed nodes along the lancing route of the deformed FEA model;
  creating respective nodal constraints to initially link together each of the existed nodes along the lancing route with a corresponding one of the surrogate lancing route nodes;
  splitting each of the lancing route elements into first and second new finite elements with the first new finite element being defined using the surrogate lancing route nodes, while the second new finite element being defined using the existed nodes, as a result, the first new finite element and the second new finite element are connected through the corresponding nodal constraints associating a separation time schedule for progressively removing said nodal constraints between the start time and the end time of the PLO; and conducting remaining of the time-marching simulation, in which each of the nodal constraints is removed in accordance with the separation time schedule to achieve numerical simulation of the PLO.

11. The system of claim 10, further comprises dividing the lancing route into one or more zones.

12. The system of claim 11, wherein each nodal constraint located in each of said one of more zones is assigned a particular separation time in the separation time schedule.

13. The system of claim 10, wherein said group of lancing route elements further include additional finite elements satisfying a proximity criterion as follows:
calculating a reference distance between each of the lancing route elements' corner nodes and the lancing route;
determining a shortest dimension between said each of the lancing route elements' corner nodes and all other neighboring corner nodes; and
when the reference distance is less than a predefined percentage of the shortest dimension, designating said each of the lancing route elements' corner nodes to be located within close proximity of the lancing route.

14. The system of claim 12, wherein the reference distance is measured from said each of the lancing route elements' corner nodes to a normal projection point on the lancing route.

15. A non-transitory computer readable storage medium containing computer executable instructions for conducting a time-marching simulation of manufacturing a sheet metal part that requires progressive lancing operation by a method comprising:
receiving, in a computer system, a finite element analysis (FEA) model representing a blank sheet metal and a die face definition that includes a lancing route of a progressive lancing operation (PLO) that starts at a start time and ends at an end time, wherein the FEA model and the die face definition are used in a time-marching simulation of manufacturing a sheet metal part, the FEA model contains a plurality of nodes connected by a plurality of finite elements, and the lancing route is defined by a series of coordinates that includes start and end locations of the lancing route;
conducting the time-marching simulation until the simulation time reaches the start time of the PLO, wherein the nodes and the finite elements of the FEA model have deformed due to contacts with the die face;
identifying those of the finite elements crossed by the lancing route as a group of lacing route elements by comparing the coordinates of the lancing route with the deformed FEA model;
creating a set of respective surrogate lancing route nodes by duplicating existed nodes along the lancing route of the deformed FEA model;
creating respective nodal constraints to initially link together each of the existed nodes along the lancing route with a corresponding one of the surrogate lancing route nodes;
splitting each of the lancing route elements into first and second new finite elements with the first new finite element being defined using the surrogate lancing route nodes, while the second new finite element being defined using the existed nodes, as a result, the first new finite element and the second new finite element are connected through the corresponding nodal constraints;
creating respective nodal constraints to initially link together said each of the existed nodes along the lancing route with the corresponding one of the surrogate lancing route nodes;
associating a separation time schedule for progressively removing said nodal constraints between the start time and the end time of the PLO; and
conducting remaining of the time-marching simulation, in which each of the nodal constraints is removed in accordance with the separation time schedule to achieve numerical simulation of the PLO.

16. The non-transitory computer readable storage medium of claim 15, further comprises dividing the lancing route into one or more zones.

17. The non-transitory computer readable storage medium of claim 16, wherein each nodal constraint located in each of said one of more zones is assigned a particular separation time in the separation time schedule.

18. The non-transitory computer readable storage medium of claim 15, wherein said group of lancing route elements further include additional finite elements satisfying a proximity criterion as follows:
calculating a reference distance between each of the lancing route elements' corner nodes and the lancing route;
determining a shortest dimension between said each of the lancing route elements' corner nodes and all other neighboring corner nodes; and
when the reference distance is less than a predefined percentage of the shortest dimension, designating said each of the lancing route elements' corner nodes to be located within close proximity of the lancing route.

19. The non-transitory computer readable storage medium of claim 18, wherein the reference distance is measured from said each of the lancing route elements' corner nodes to a normal projection point on the lancing route.

* * * * *